United States Patent [19]

Matsubara et al.

[11] Patent Number: 5,325,228
[45] Date of Patent: Jun. 28, 1994

[54] OPTICAL SHUTTER DEVICE

[75] Inventors: Ken Matsubara; Kouichi Shingaki; Tsukasa Yagi; Hirohisa Kitano, all of Osaka; Itaru Saito, Itami; Kenichi Wada, Takatsuki; Atsushi Fujita, Otsu, all of Japan

[73] Assignee: Minolta Camera Kabushiki Kaisha, Osaka, Japan

[21] Appl. No.: 679,758

[22] Filed: Apr. 3, 1991

[30] Foreign Application Priority Data

Apr. 4, 1990 [JP] Japan ............................ 2-91022
Apr. 10, 1990 [JP] Japan ............................ 2-95560

[51] Int. Cl.[5] ........................... G02F 1/03; G02F 1/01; G09G 3/00
[52] U.S. Cl. .................................. 359/249; 359/245; 359/252; 359/276; 359/322; 345/214
[58] Field of Search .................... 359/245, 246, 249, 251, 359/252, 276, 322, 323; 340/812, 813

[56] References Cited

U.S. PATENT DOCUMENTS

| 2,909,973 | 10/1959 | Koelsch, Jr. et al. | 359/245 |
| 3,780,296 | 12/1973 | Waksberg et al. | 359/249 |
| 5,024,511 | 6/1991 | Matsubara et al. | 359/245 |

FOREIGN PATENT DOCUMENTS 63-189268  4/1988  Japan.

Primary Examiner—Loha Ben
Assistant Examiner—Evelyn A. Lester
Attorney, Agent, or Firm—Price, Gess & Ubell

[57] ABSTRACT

An optical shutter device for use, e.g., in an optical printer includes a plurality of electrooptic chips each having a plurality of very small segments for optical modulation. The optical shutter device has a voltage adjusting circuit which individually supplies the driving voltage to the chips depending on the light transmitting characteristics intrinsic to the chips. Thus, even when the chips have different light transmitting characteristics, the image produced by the chips will have a uniform intensity.

21 Claims, 8 Drawing Sheets

OPTICAL SHUTTER DEVICE

BACKGROUND OF THE INVENTION

1. Field of the Invention

The present invention generally relates to an optical shutter device using an electrooptic material such as PLZT, or the like, for the optical modulation purpose used, for example, in an optical printer, and more particularly, to an optical shutter device wherein a plurality of chips of an electrooptic material each having a plurality of very small segments for the optical modulation purpose per a unit of dot are connected to each other.

2. Description of the Prior Art

In an optical shutter device of the type referred to above which uses an electrooptic material such as PLZT or the like, the quantity of the transmitting light passing through the PLZT chips is changed depending on the intensity of the driving voltage impressed on each of the plurality of very small segments of the chips as well as the length of the applying time. For example, when the optical shutter device is installed in an electrophotographic optical printer, the quantity of the transmitting light through the optical shutter device can be varied. Thus, it is possible to change the amount of light irradiated on the photoconductive photosensitive body. Accordingly, the electric charges on the photoconductive photosensitive body is decreased proportionally to the radiated light thereon, resulting in formation of a latent image which may be of a two tone image or a gray level image.

The conventional optical shutter device of the above-mentioned type has, however, the following problems.

The electrooptic material used in the optical shutter device is obtained through sintering at high temperatures and with high pressure, and therefore, the size of one chip of the electrooptic material is limited. If the optical shutter device is used in the optical printer, for example, it is necessary for the optical shutter device to have a length approximately equal to the length of one recording line, i.e., the recording width. Therefore, a plurality of the chips are aligned in a line to obtain the required optical shutter device. However, the half-wave voltage (or half-wavelength voltage) which is the voltage impressed across the electrooptical material to obtain the maximum transparency, differs for each chip because Of the variation of the electrooptic coefficient between the chips or the variation of gaps between independent electrodes and a common electrode. If the same driving voltage is impressed for recording, the recording results in non-uniform operation due to the difference of the characteristic of the electrooptic material, and the variation in the distance between the electrodes. As such, it is required to use chips of the electrooptic material having the characteristic as uniform as possible, which however lowers the yield of the chips for the optical shutter device, leading eventually to an increase of the cost of the optical shutter device itself.

SUMMARY OF THE INVENTION

An essential object of the present invention is to provide an optical shutter device in a simple structure which is capable of avoiding the variation of the quantity of the transmitting light resulting from the difference in the characteristic of an electrooptic material.

The optical shutter device of the present invention features a voltage adjusting circuit, whereby the driving voltage for modulation purpose impressed on each of a plurality of chips corresponding to the recording information is made different.

The above voltage adjusting circuit is obtained in such arrangements as described below.

The number of diodes interposed in series connection in each driving line is changed in accordance with the difference of the electrooptic characteristic of the chips. The driving line is to feed the driving voltage to the chips from a driving power source, and the forward direction of the diodes are inserted. Besides, it may be possible to connect a discharging diode in addition to the above-described diodes in parallel to the latter so as to discharge the electric charges accumulated at both ends of the latter.

When arranging a plurality of chips of the electrooptic material in parallel, the half-wave voltage is preliminarily measured for each chip. Since the driving voltage for each chip is changed by the voltage adjusting circuit, the driving voltage for each chip becomes the respective measured half-wave voltage even when the same maximum value of the driving voltage is impressed on the chips. Accordingly, the transmitting rate is made a maximum for each chip despite the difference in the characteristic of the chips.

Moreover, the difference in the half-wave voltage is not conspicuous at a plurality of the very small segments of the chip, which are rather so small as to hardly produce a difference in the recording density even if the halfwave voltage is used for the optical modulation in recording. Noting this fact, although many segments are aligned in the chip, it is enough for the voltage adjusting circuit to change the driving voltage for each chip, not for each small segment, thereby avoiding the complexity of the structure.

A further feature of the optical shutter device of the present invention is a driving circuit. The driving circuit impresses uniformly to every chip an intermediate value of the maximum half-wave voltages and the minimum half-wave voltages of a number of half-wave voltages of the chips as the common maximum value of the driving voltage.

The above driving circuit may be provided with a temperature compensating means for automatically changing the maximum value of the driving voltage to correct the change of the characteristic of the electrooptic material subsequent to the temperature change.

The driving voltage impressed by the driving circuit is varied in a manner as described below. That is, an intermediate voltage of the maximum and minimum half-wave voltages of the chips, preferably the average of the half-wave voltages of the chips is uniformly impressed to every chip as the common maximum value of the driving voltage. In another way, the driving circuit may be automatically adjusted by a means which sequentially changes the driving voltage to measure the half-wave voltage of each chip and a holding means which holds the maximum value of the amount of the transmitting light of the chips. Based on the measured result, the intermediate voltage between the maximum and minimum half-wave voltages, preferably the average of the half-wave voltages of the chips is uniformly impressed to every chip as the common maximum value of the driving voltage. Therefore, even if the half-wave voltages are different among the chips, it can be avoided that an extraordinarily different voltage from the proper half-wave voltage of the chip is impressed thereto as the driving voltage.

In other words, the moderate half-wave voltage is made the common driving voltage to the plurality of the chips, so that every chip can be driven without a difference.

Particularly, if the driving circuit is equipped with a temperature compensating means to automatically change the maximum value of the driving voltage to correct or compensate the change in the characteristic of the electrooptic material subsequent to the temperature change, every chip can be driven continuously without having a an difference with the temperature change.

BRIEF DESCRIPTION OF THE DRAWINGS

This and other objects and features of the present invention will become apparent from the following description taken in conjunction with preferred embodiments thereof with reference to the accompanying drawings, in which.

DESCRIPTION OF THE PREFERRED EMBODIMENTS

Figure 1:
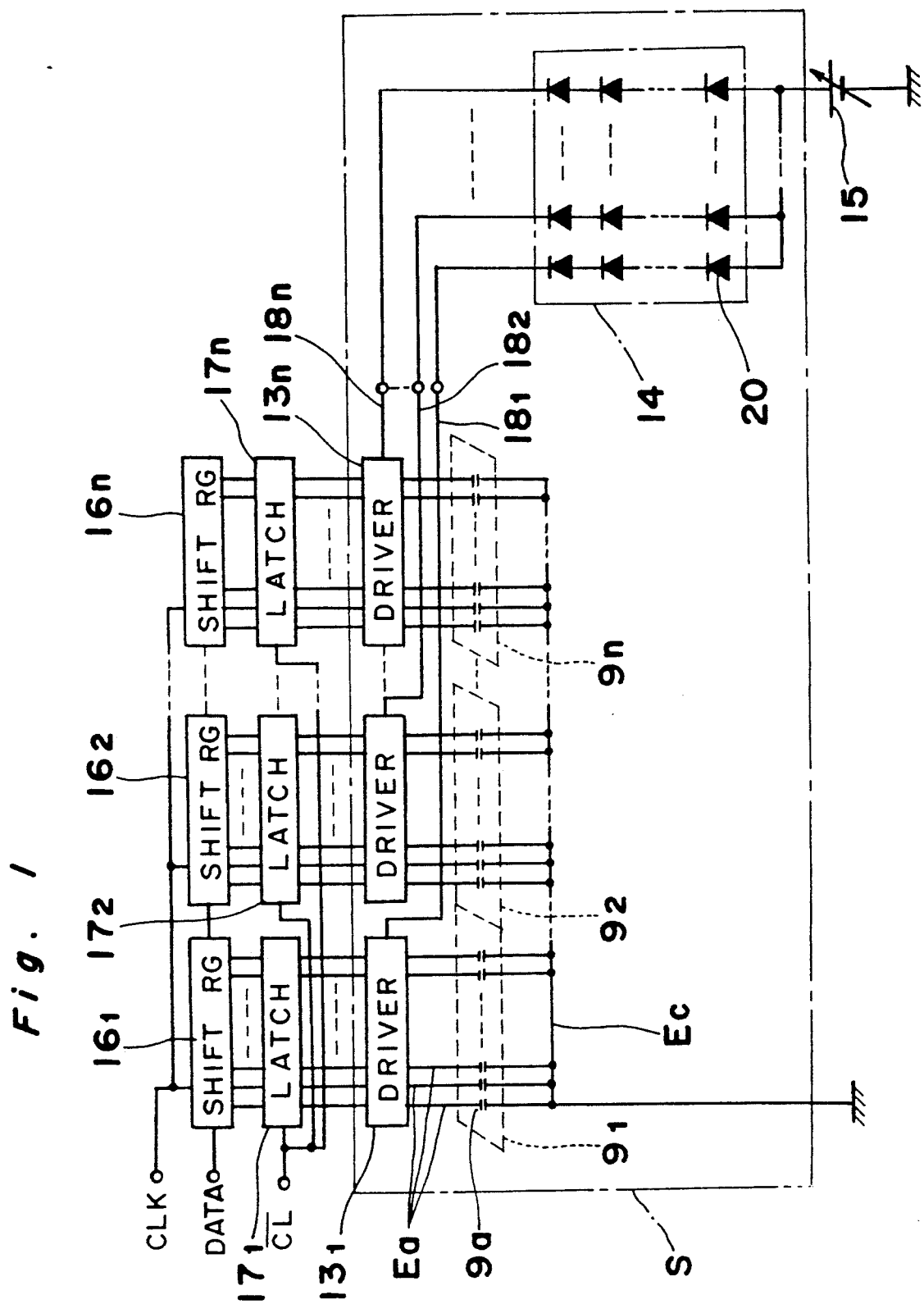
FIG. 1 is a circuit diagram schematically showing the structure of an optical shutter device according to a first embodiment of the present invention.

Before the description of the present invention proceeds, it is to be noted here that like parts are designated by like reference numerals throughout the accompanying drawings.

First Embodiment

Figure 2:
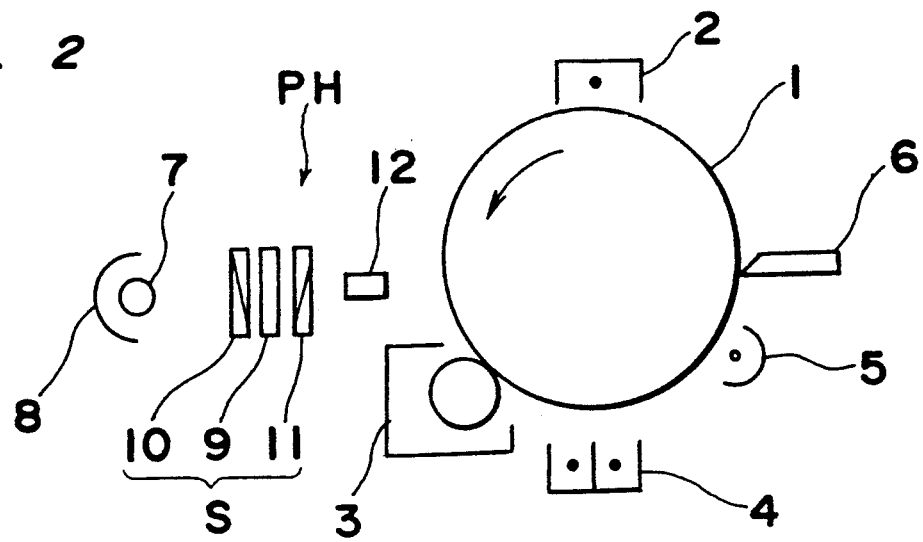
FIG. 2 is a diagram schematically showing the structure of an optical printer.

Referring first to FIG. 2, an optical printer consists of a drum-shaped photosensitive body 1 rotated in a direction shown by an arrow, a charging unit 2 for uniformly charging the surface of the photosensitive body 1, an optical printing head PH which forms an electrostatic latent image corresponding to the recording information on the photosensitive drum 1, a developing device 3 which adheres toners to the electrostatic latent image thereby to make the image visible, a transfer/separating device 4 which transfers the toner image on the photosensitive body 1 to a recording paper (not shown) and then separates the recording paper from the photosensitive body 1, a main eraser 5 for erasing the electric charges remaining on the photosensitive body 1 and a cleaner 6 for scraping the remaining toners off the photosensitive body 1.

In the optical printer of the above structure, the recording information is recorded on the recording paper through the electrophotographic technology.

The optical printing head PH is provided with an optical shutter device S and a lens array 12 of the refractive index distribution type. The optical shutter device S is comprised of a light source 7, a reflecting mirror 8, a PLZT array 9 formed of a plurality of electrooptic chips arranged in parallel to the elongated direction of the photosensitive body 1, and a pair of polarizers 10 and 11 provided in a crossed Nicol in front of and at the back of the PLZT array 9. The light passing through the optical shutter device S is projected by the lens array 12 to form an image on the surface of the photosensitive body 1.

Figure 3:
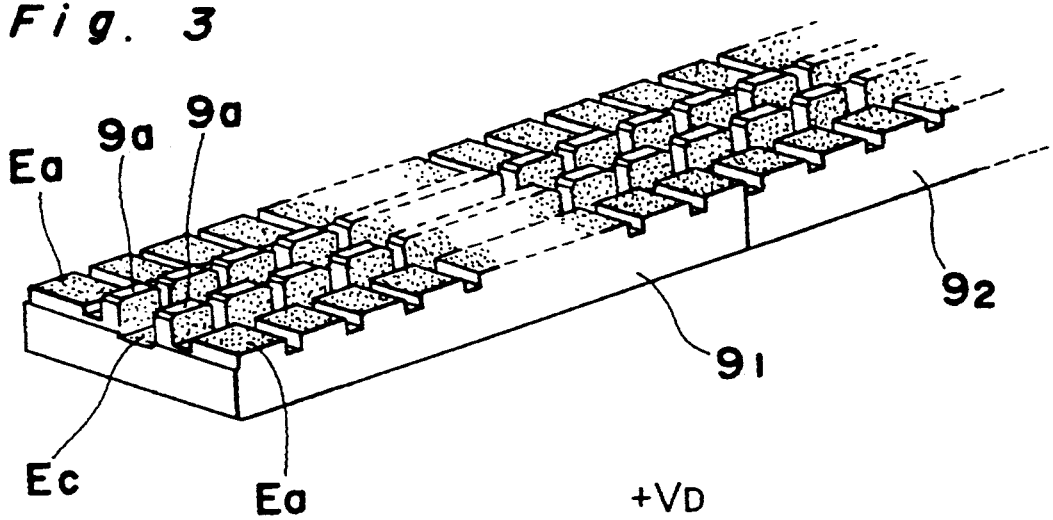
FIG. 3 is a perspective view of a PLZT chip.

As shown in FIGS. 1 and 3, a plurality of PLZT chips $9_1$–$9_n$ are aligned in one array in the PLZT array 9. In each PLZT chip, a plurality of very small segments $9a$ (indicated as a capacitor in FIG. 1) are formed zigzag along the direction of alignment of the PLZT chips $9_1$–$9_n$. Each segment $9a$ represents a dot for forming the image. A separate electrode Ea is formed individually for each segment $9a$ to impress the driving voltage for optical modulation to the very small segment $9a$. Also, a common electrode Ec is provided for common use to all the segments $9a$.

The PLZT chips $9_1$–$9_n$ are provided respectively with drivers $13_1$–$13_n$ so as to selectively impressed a driving pulse to segments $9a$ in the PLZT chip. The driving voltage from a driving power source 15 is supplied to each driver $13_1$–$13_n$ through a voltage adjusting circuit 14. The recording information data is transferred from a recording memory to shift registers $16_1$–$16_n$ and is temporarily latched in latches $17_1$–$17_n$. The recording information data stored in latches $17_1$–$17_n$ is input to the drivers $13_1$–$13_n$ from which the data is applied to corresponding chips $9_1$–$9_n$. As shown in FIG. 1, shift registers $16_1$–$16_n$, latches $17_1$–$17_n$, drivers $13_1$–$13_n$ and chips $9_1$–$9_n$ are provided correspondingly.

Each of the drivers $13_1$–$13_n$ provides the driving voltage to the segments $9a$ at a predetermined pulse rate in accordance with the recording information data.

In the optical printing head PH equipped with the PLZT array 9 described above in connection with FIG. 2, the light from the light source 7 passes through the optical shutter device S, but first through the first polarizer 10 at the side closer to the light source 7. The polarizer 10 allows the light waves in one direction to pass therethrough to produce a plane polarized light. Since the PLZT in the PLZT array 9 has a multi-refraction structure, the plane polarized light is turned by an angle relatively to the voltage impressed to the PLZT. The second polarizer 11 at the side closer to the photosensitive body 1 is arranged in a crossed Nicol with the first polarizer 10, such that the polarizing planes of polarizers 10 and 11 are angled at 90°. Thus, the first polarizer 10 is set in the X-direction and the second polarizer 11 is set in the Y-direction.

Thus, when the plane polarized light from the first polarizer 10 passes through the PLZT segment $9a$ impressed with no voltage, the plane polarized light is completely blocked by the second polarizer 11. However, when the plane polarized light from the first polarizer 10 passes through the PLZT segment $9a$ impressed with a voltage relative to the applied number of pulses to the separate electrode Ea, the plane polarized light from the first polarizer 10 is turned by an angle relative to the impressed voltage. In this case, some of the plane polarized light passes through the second polarizer 11 to produce a light with a reduced brightness. In this manner, the brightness of the light passing through the second polarizer 11 is dependent on the voltage impressed to the PLZT segment $9a$, such that, as the voltage at the electrode Ea increases, the light becomes brighter until a certain brightness and then becomes darker. The brightest light is obtained when the PLZT turns the plane polarized light by 90°. Such a voltage to cause the PLZT to turn the plane polarized light by 90° is referred to as a half-wave voltage. The voltage at the electrode Ea is proportion to the product of the applied current and applied time.

The light that has passed through the optical shutter device S, is irradiated by the lens array 12 on the photosensitive body 1 to form an electrostatic latent image such that the electric charge on the photosensitive body 1 is reduced relatively to the light intensity. Then, the toners are adhered by the developing device 3 to the portion where the electric charges remain. As a result, the electrostatic latent image is turned into a visible toner image. The toner image is in turn transferred and fixed on a recording paper.

As shown in FIG. 1, the driving voltage from the driving power source 15 is individually supplied to driving lines $18_1$–$18_n$. The voltage from one driving line is supplied to the separate electrodes Ea of PLZT chip through one driver. By the driver, the driving voltage is selectively impressed to the segments $9a$ in the chip. The voltage adjusting circuit 14 includes a plurality of diodes 20 presented in a plurality of series connections, which are in turn connected to driving lines $18_1$–$18_n$, respectively.

Next, the structure and operation of the voltage adjusting circuit 14 will be discussed hereinbelow.

As is mentioned before, the PLZT array 9 is obtained by connecting a plurality of the PLZT chips $9_1$–$9_n$. Since the PLZT is sintered at a high temperature and high pressure, the size of one chip is limited. A plurality of PLZT chips are aligned to form the PLZT array 9 so that the total length of the PLZT array is enough to cover the recording width. However, because the electrooptic coefficient and the distance between the separate electrode Ea and common electrode Ec vary by the chips, the half-wave voltage, at which the maximum transparency is obtained, differs among the PLZT chips. To obtain a uniform brightness image, it is necessary to impress the half-wave voltage as the driving voltage to each PLZT chip. However, since the half-wave voltage differs by the PLZT chips, the same driving voltage for all of the PLZT chips results in irregularity in the recording density among the chips, i.e., along the aligned direction of the chips $9_1$–$9_n$.

According to the present invention, the voltage adjusting circuit 14 is provided in association with the driving power source 15 so that the voltage along the driving lines $18_1$–$18_n$ can be individually set to the half-wave voltages for the chips $9_1$–$9_n$, respectively.

Figure 4:
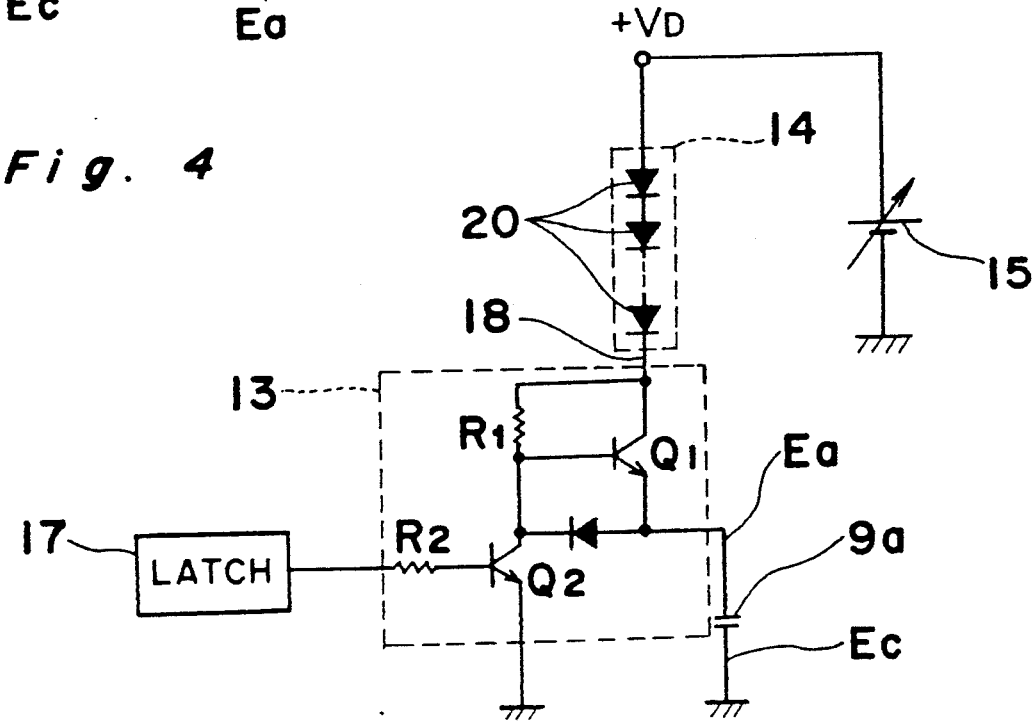
FIG. 4 is a circuit diagram essentially showing the structure of the optical shutter device.

The structure of this arrangement will be briefly described with reference to FIG. 4. In an example of FIG. 4, a plurality of diodes 20 are connected in series to each driving line 18 to supply the driving voltage from the driving power source 15 to the separate electrodes Ea through the driver 13 formed by a pair of switching elements Q1 and Q2. The driving voltage is changed by changing the number of the diodes 20.

Figure 5:
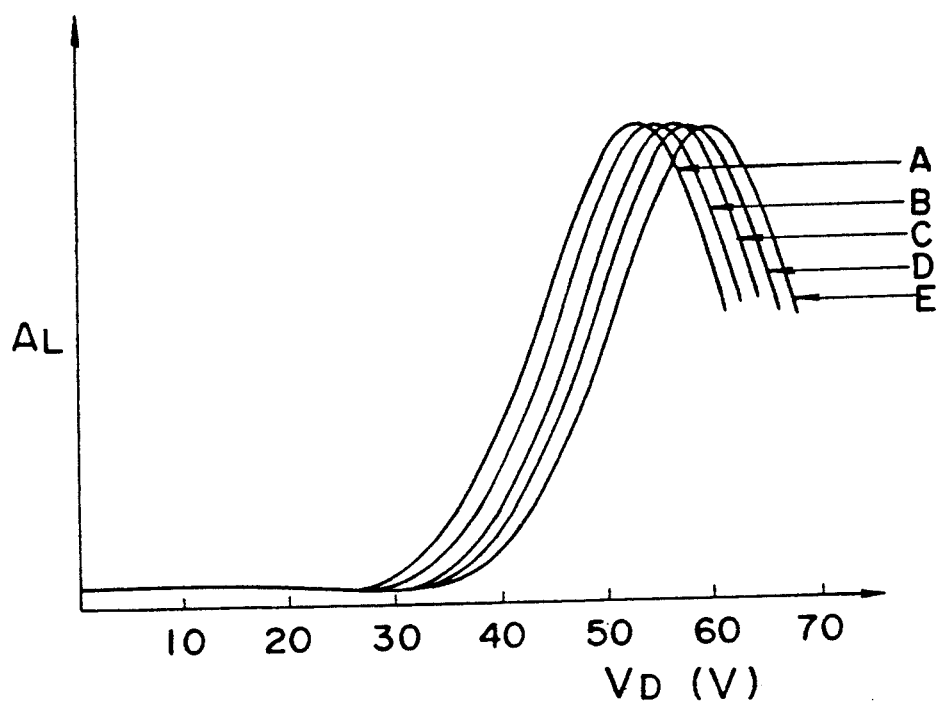
FIG. 5 is a graph showing a relationship between the driving voltage and the amount of the transmitting light.

Referring now to FIG. 5, a relationship between the driving voltage $V_D$ measured at the driving power source 15 and the amount of the transmitting light $A_L$ through the optical shutter device S at a very small segment $9a$ is shown. Curve A in the graph represents the case where no diode 20 is provided between the driving power source 15 and the driver 13. Curve B represents the case when two diodes 20 are provided between the driving power source 15 and the driver 13. Similarly, curves C, D and E respectively represent the cases when four, six and eight diodes 20 are inserted between the driving power source 15 and the driver 13. As apparent from the graph, the half-wave voltage (i.e., the voltage at the peak point of the curve ) changes relatively to the number of diodes 20 inserted. Since the voltage drop across one diode is 0.6 volt, the curves A–E shows different adjusted driving voltage patterns which vary at the rate of 1.2 volts.

The number of the diodes 20 inserted in each of the driving lines $18_1$–$18_n$ is determined in a manner as described below.

A shutter device S is formed with a plurality of the PLZT chips $9_1$–$9_n$ aligned to form the PLZT array 9. Then, the PLZT chips $9_1$–$9_n$ are tested one at a time, such that a light beam with a predetermined light intensity is irradiated to the testing PLZT chip to measure the amount of the transmitting light relatively to the change of the driving voltage at the driving power source 15. From the measured result, a voltage at which the peak light transmission is obtained is recorded. The recorded voltage is the half-wave voltage intrinsic to the tested PLZT chip. In this manner, the half-wave voltages intrinsic to the PLZT chips $9_1$–$9_n$ are obtained.

Figure 6:
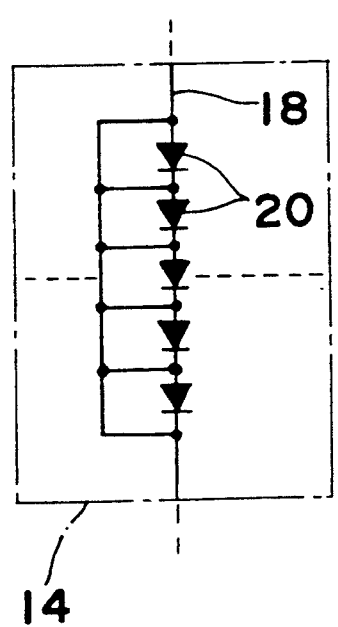
FIGS. 6 and 7 are circuit diagrams of a part of the voltage adjusting circuit.
Figure 7:
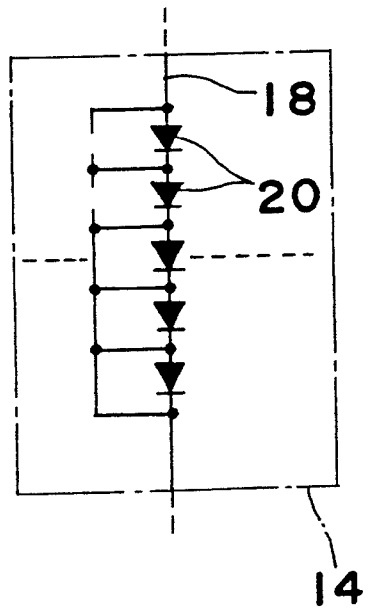

Previously, the driving lines $18_1$–$18_n$ are each connected with a series connection of short-circuited diodes 20 with the number of diodes used in each series connection is the same, as shown in FIG. 6. Thus, at the first, every diode 20 is short-circuited between the anode and cathode thereof. Then, the necessary number of the short-circuits are opened in accordance with the measured half-wave voltages of PLZT chips $9_1$–$9_n$, as shown in FIG. 7, to provide an adjusted driving voltage individually to each of the PLZT chips $9_1$–$9_n$. In this manner, the number of the diodes 20 to be used in each of the driving lines $18_1$–$18_n$ can be easily changed.

By the voltage adjusting circuit 14 of the above-described structure, the constant driving voltage from the driving power source 15 is changed to the adjusted driving voltage specially set for each of the driving lines $18_1$–$18_n$ so that the half-wave voltage can be impressed simultaneously to a plurality of the PLZT chips $9_1$–$9_n$. Accordingly, even when the PLZT chips $9_1$–$9_n$ have different half-wave voltage, the amount of the transmitting light through the PLZT chips $9_1$–$9_n$ driven by a common power source 15 will be the same. As a consequence, the recording density can be made uniform. In other words, the same number of driving pulses for all the PLZT chips results in the same light intensity that passes through the shutter device.

It is to be noted that the variation of the half-wave voltages between the segments $9a$ in each chip $9_1$–$9_n$ is so small that it can be ignored from the viewpoint of irregularity in the recording density. Therefore, to provide the adjusted driving voltages to the chips $9_1$–$9_n$ is considered rational to remove the difference in the recording density.

In the above described first embodiment, instead of opening the short-circuited diodes 20 to insert a required number of diodes in each driving line, the required number of diodes 20 can be inserted during the assembling of the device.

Figure 8:
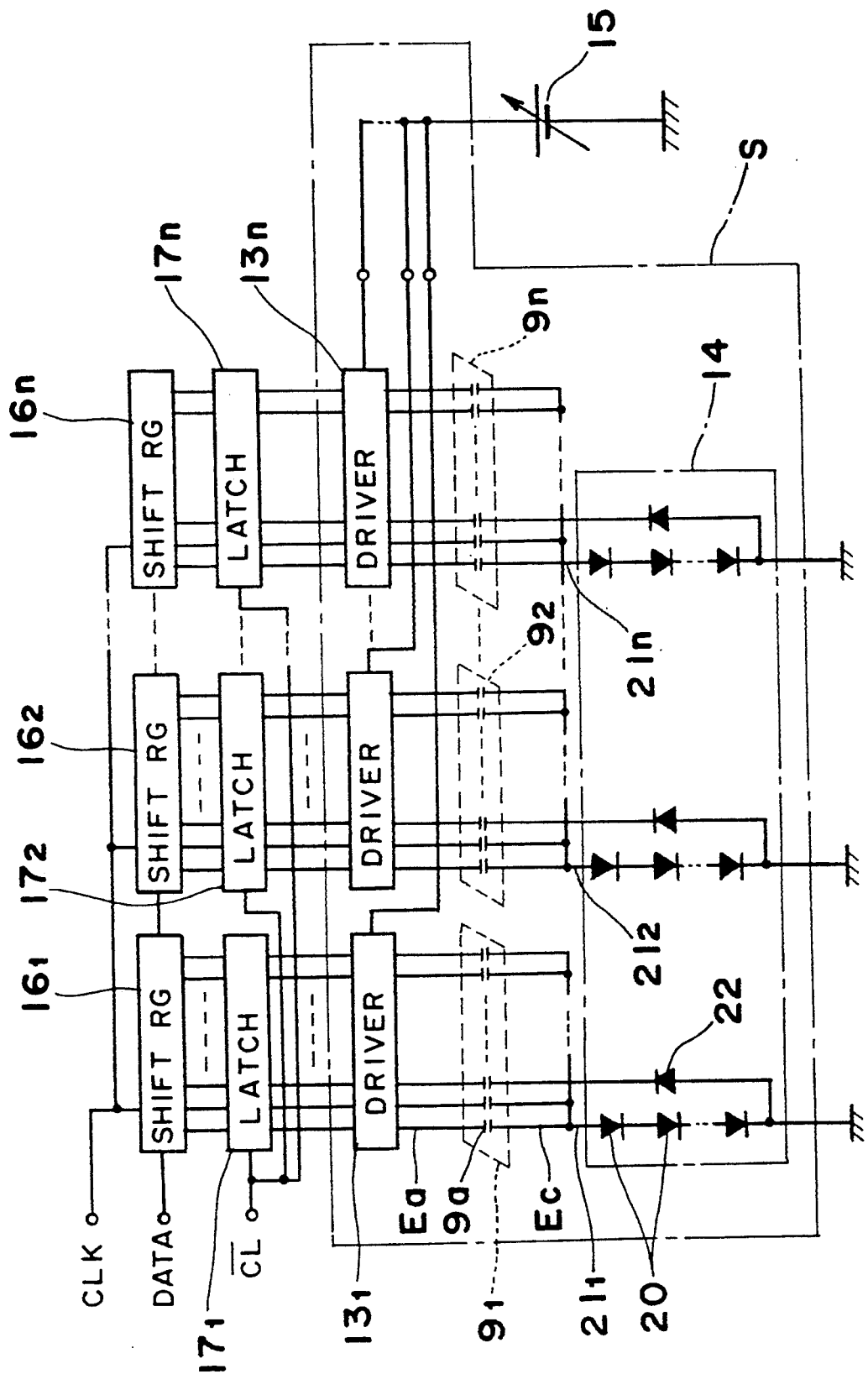
FIG. 8 is a circuit diagram schematically showing a modification of the first embodiment.

Referring to FIG. 8, a modification of the first embodiment is shown. The voltage adjusting circuit 14 is inserted in grounding lines $21_1$–$21_n$ which extend from the common electrodes Ec of PLZT chips $9_1$–$9_n$. Moreover, a discharging diode 22 is connected in parallel to the series connection of diodes 20 so as to discharge the electric charges stored at both ends of the group of the diodes 20. Since the number of the diodes 20 is changed for each chip $9_1$–$9_n$, the adjusted driving voltage becomes different for each chip $9_1$–$9_n$ when the voltage from the power source 15 is impressed to the PLZT segments $9a$ through the drivers $13_1$–$13_n$. As a result, the amount of the transmitting light becomes equal for each chip $9_1$–$9_n$ in a manner described above.

Figure 9:
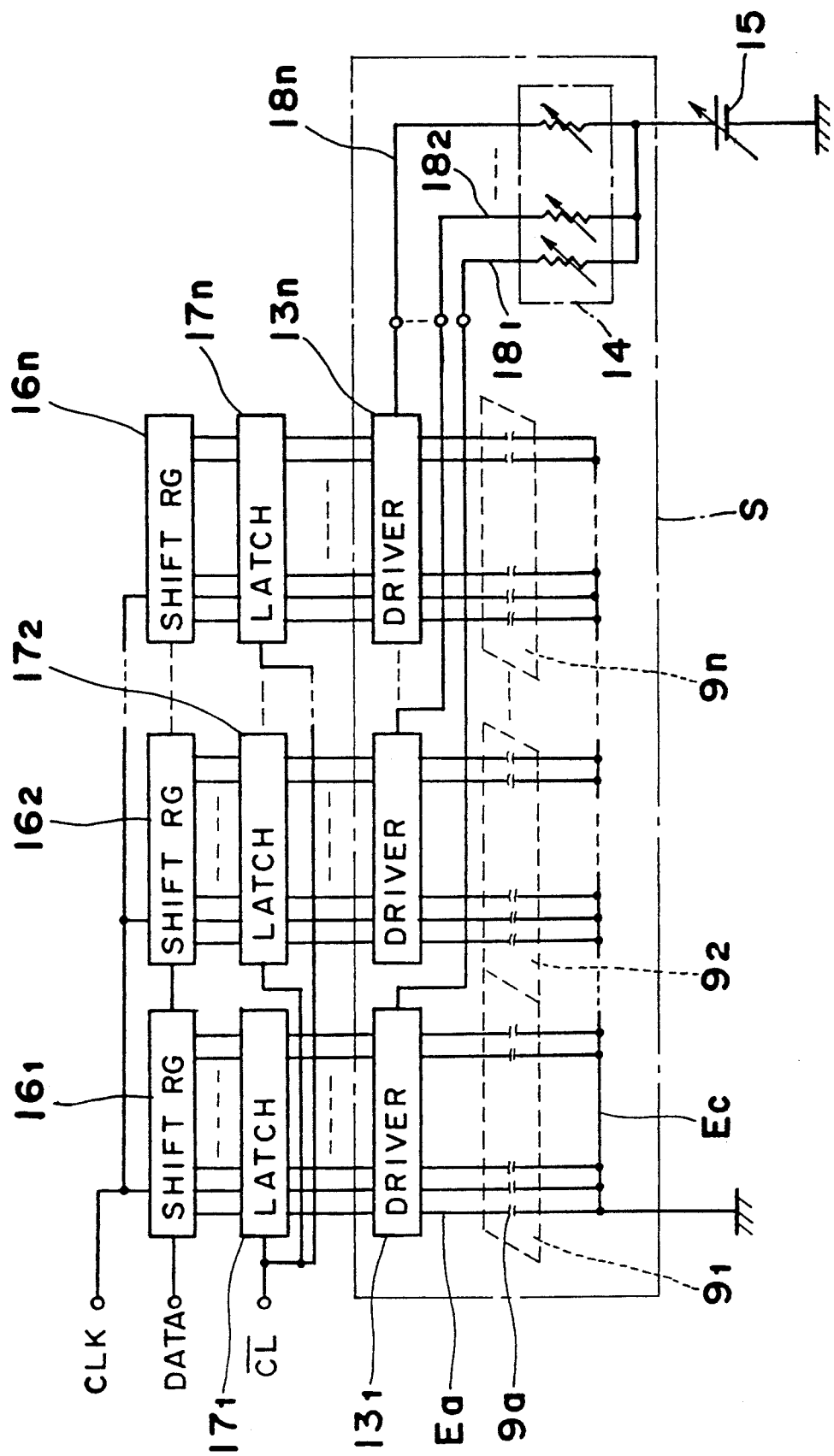
FIG. 9 is a view similar to FIG. 8, but showing another modification of the first embodiment.

Referring to FIG. 9, another modification of the first embodiment is shown. According to this modification, the diodes 20 are replaced with variable resistors 23 in each driving line.

According to the modification of FIG. 9, when the optical shutter device S is driven, the time constant determined by the variable resistor 23 and the segment $9a$ change when the segments $9a$ of each PLZT chip are charged through the application of the driving voltage from the power source 15. Thus, the waveform of the pulsating driving voltage may be undesirably deformed. Therefore, it is more desirable to employ the embodiment of FIG. 1 with diodes 20.

Second Embodiment

Next, the second embodiment of the present invention is described.

Figure 10:
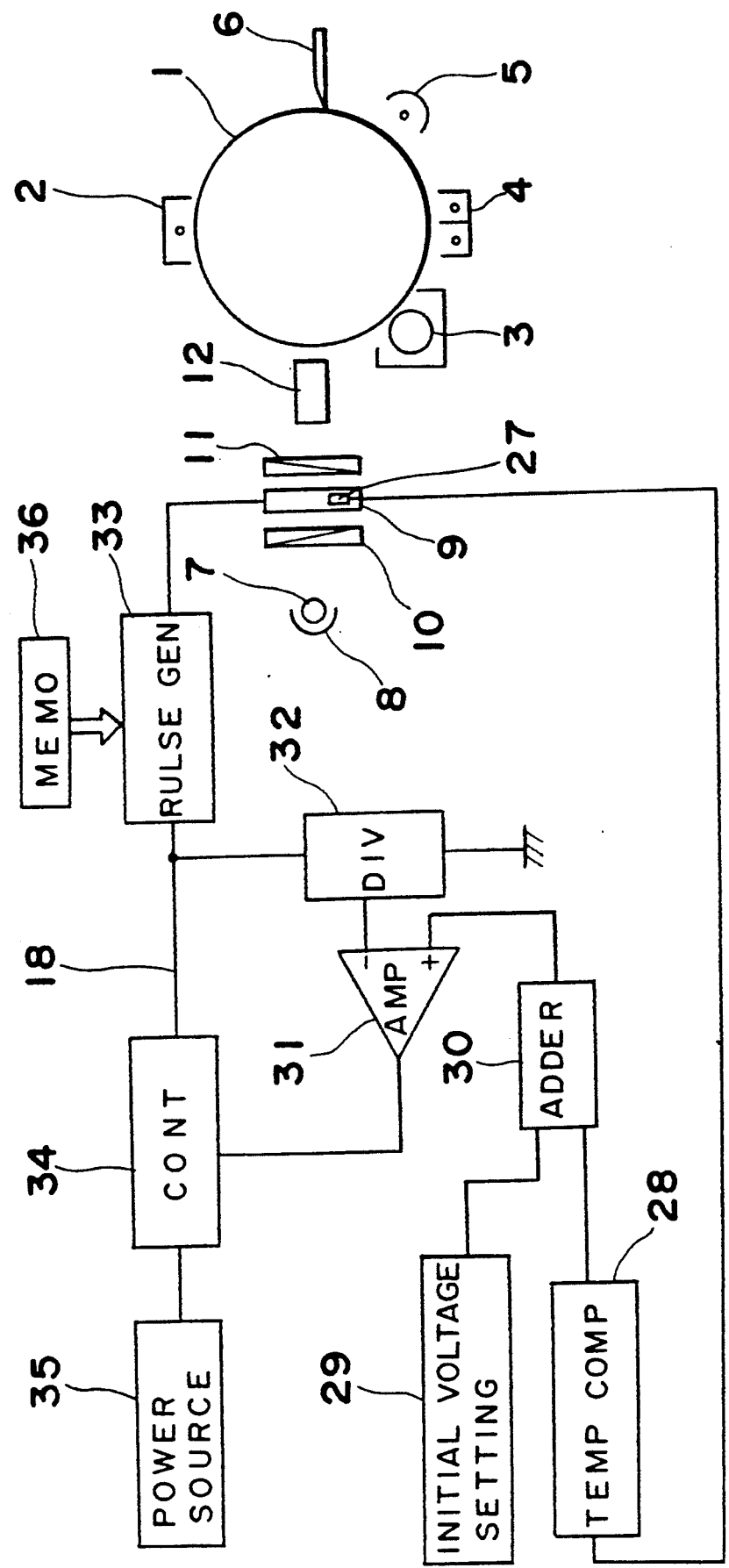
FIG. 10 is a block diagram of a driving part of the optical shutter device according to the second embodiment of the present invention.

Referring to FIG. 10, the optical shutter device according to the second embodiment includes the array 9 of PLZT chips $9_1$–$9_n$ arranged in the same manner as that shown in FIGS. 1 and 3. The PLZT chips are connected to drivers $13_1$–$13_n$, latches $17_1$–$17_n$ and shift registers $16_1$–$16_n$ in the same manner as those shown in FIG. 1. In FIG. 10, the drivers $13_1$–$13_n$ are generally indicated by pulse generator 33, and shift registers $16_1$–$16_n$ and latches $17_1$–$17_n$ are generally indicated by a memory 36. Also, the driving lines $18_1$–$18_n$ are generally indicated by line 18.

In the second embodiment, the PLZT chip array 9 is further coupled with a temperature sensor 27 for detecting the temperature of the PLZT chip array 9. The detected temperature is applied to a temperature compensating circuit 28 which is connected to an adder 30. The adder 30 is also connected to an initial voltage setting circuit 29. The voltage from adder 30 is applied to an amplifier 31 which also receives a voltage from a voltage divider 32. The output of amplifier 31 is connected to a control 34 which receives voltage from a power source 35 and supplies regulated power to a pulse generator 33. Based on the stored data in memory 36, the pulse generator 33 provides pulses at a predetermined pulse rate to PLZT chip array 9 to change the turning angle of the plane polarized light from the first polarizer 10.

According to the second embodiment, unlike the first embodiment, the same but specially selected amount of voltage is applied to the driving lines $18_1$–$18_n$ from control 34, as explained below.

The half-wave voltages for the different PLZT chips are previously obtained in the same manner as described above. Then, an average of the half-wave voltages is calculated, and is impressed on the driving lines 18. Thus, in the second embodiment, the average of the half-wave voltages is used as the driving voltage to all of the PLZT chips.

Instead of using the average, it is possible to use a mid voltage between the maximum an minimum half-wave voltages.

If the PLZT chip used is a product already in the commercial market, the nominal driving voltage is indicated. In such a case, such voltages may by used for obtaining the averaged half-wave voltage or the mid half-wave voltage.

According to the second embodiment, the temperature compensation is further added for controlling the voltage as explained below.

Figure 11:
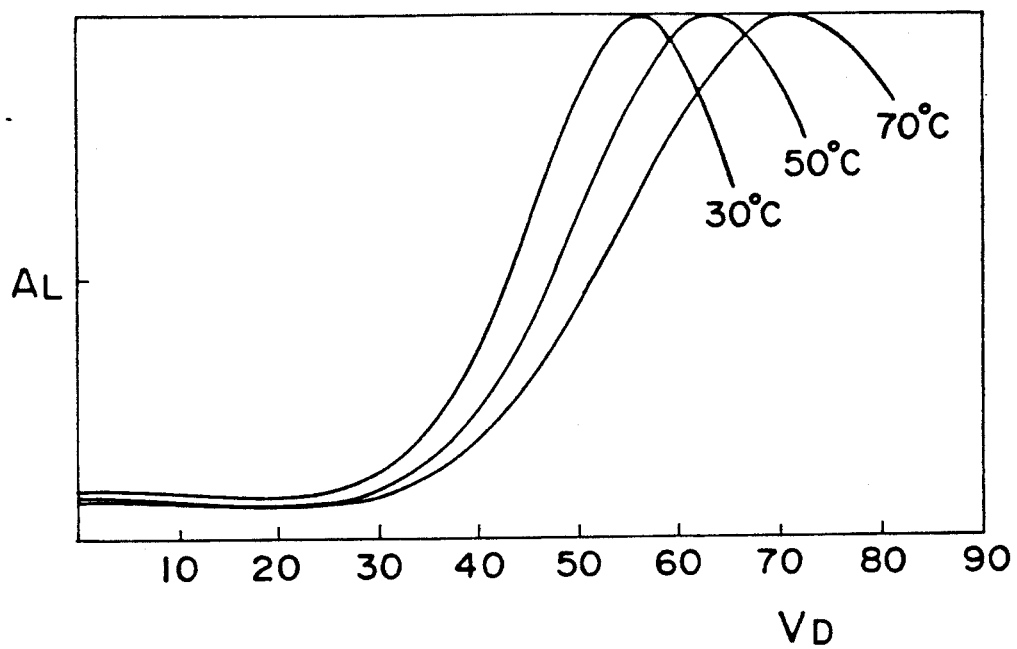
FIGS. 11 and 12 are graphs showing a relationship between the driving voltage and the amount of the transmitting light relative to the temperature change.

The amount of the transmitting light through the shutter device S is changed not only depending on the impressed voltage, but also depending on the temperature of the PLZT chip array, as shown in the graph of FIG. 11 in which the abscissa represents the impressed driving voltage $V_D$ and the ordinate represents the amount of the transmitting light $A_L$. The three curves are obtained by using the same PLZT chip but under different temperatures. As is understood from the graph, the half-wave voltage (i.e., the voltage at the peak point of the curve) increases as the temperature increases. As apparent from the above description, such a change in the half-wave voltage caused by the temperature change results in the change of the intensity difference of the reproduced image.

In order to obtain a uniform density of the reproduced image irrespective of the temperature change, the temperature compensating circuit 28 is provided to counterbalance the half-wave voltage change caused by the temperature change in a manner described below.

As shown in FIG. 10, an output of the temperature sensor 27, which is provided at a substrate of the optical shutter device S is input to a temperature compensating circuit 28 and a voltage signal output from the circuit 28 is input to an adder 30, as well as the initial voltage from the initial voltage setting circuit 29. In the initial voltage setting circuit 29, the mid half-wave voltage which is between the maximum and minimum half-wave voltages obtained at a standard temperature, such as 30° C. is set as the initial voltage. The initial voltage may be varied depending on the environmental condition. Also, instead of the mid half-wave voltage, the averaged half-wave voltage at the standard temperature can be used.

In the temperature compensating circuit 28, the driving voltage shift amount which corresponds to the difference between the standard temperature and the temperature detected by said temperature sensor 27 is detected, for example, by reading a table. Thus obtained driving voltage shift amount is output to the adder 30. Accordingly, adder 30 produces a sum of the initial voltage and the driving voltage shift amount. The output from the adder 30 is input to the positive terminal of amplifier 31. The driving voltage from the voltage control 14 is fed back to the negative terminal of amplifier 31 via a voltage divider 32.

Figure 12:
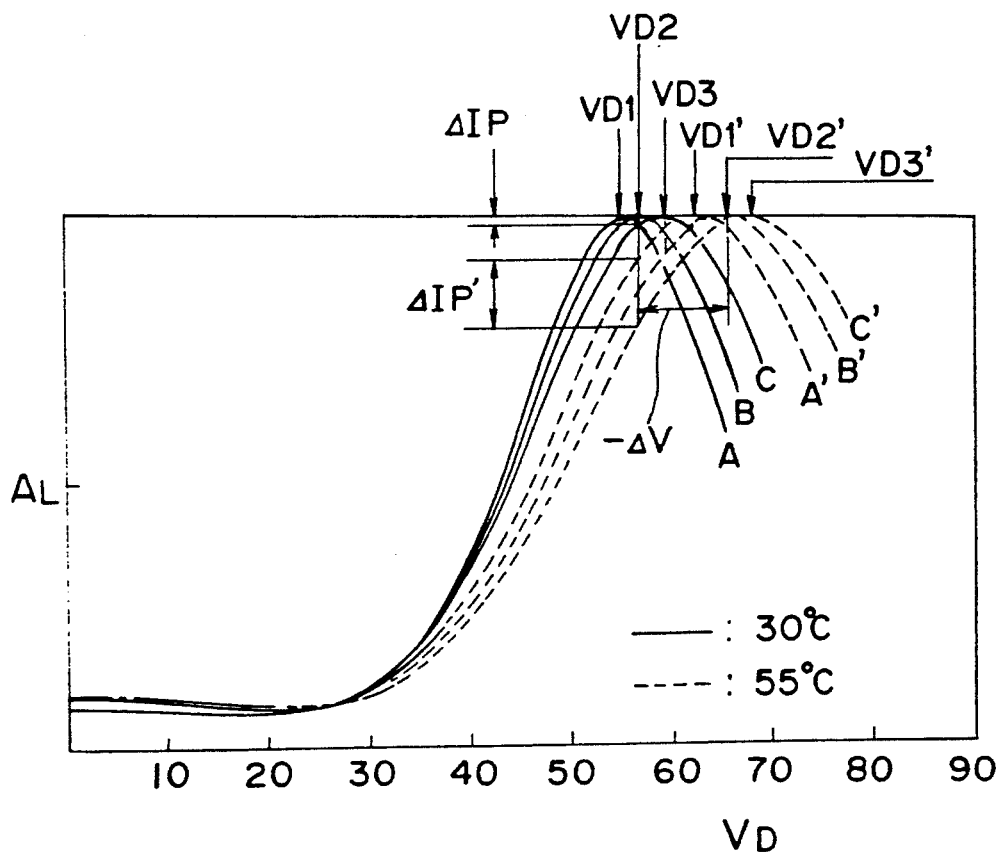

Referring to FIG. 12, a relationship between the driving voltage $V_D$ and the transmitted light amount $A_L$ is shown. A solid curves are obtained at the temperature of 30° C. and dotted curves are obtained at the temperature of 55° C. The minimum and maximum half-wave voltages $V_{D1}$ and $V_{D3}$ at 30° C. are found in curves A and C, and a mid half-wave voltage $V_{D2}$ at 30° C. which is between $V_{D1}$ and $V_{D3}$ is found in a curve B.

The intermediate half-wave voltage $V_{D2}$ is set as the aforementioned initial voltage.

Curves A', B' and C', show the shift of the curves A, B and C, respectively, as the result of the temperature increase to 55° C. At 30° C., the difference in the transmitted light amount $A_L$ between the PLZT chips with the minimum and maximum half-wave voltages $V_{D1}$ and $V_{D3}$ is $\Delta$IP, but at 55° C. the same is $\Delta$IP' which is much greater than $\Delta$IP. However, according to the second embodiment, the temperature compensating circuit 28 obtains a compensating voltage $-\Delta V$ by the table stored therein, and in the adder 30, the compensating voltage $-\Delta V$ is added to the initial voltage. Thus, in the example shown in FIG. 12, even when the temperature is increased to 55° C., the curves A', B' and C' can be shifted back approximately to curves A, B and C, to obtain the light transmission characteristics as if the temperature is at the initial setting temperature. Thus, the unevenness in the recording density is prevented even when the temperature changes in the PLZT array 9.

Figure 13:
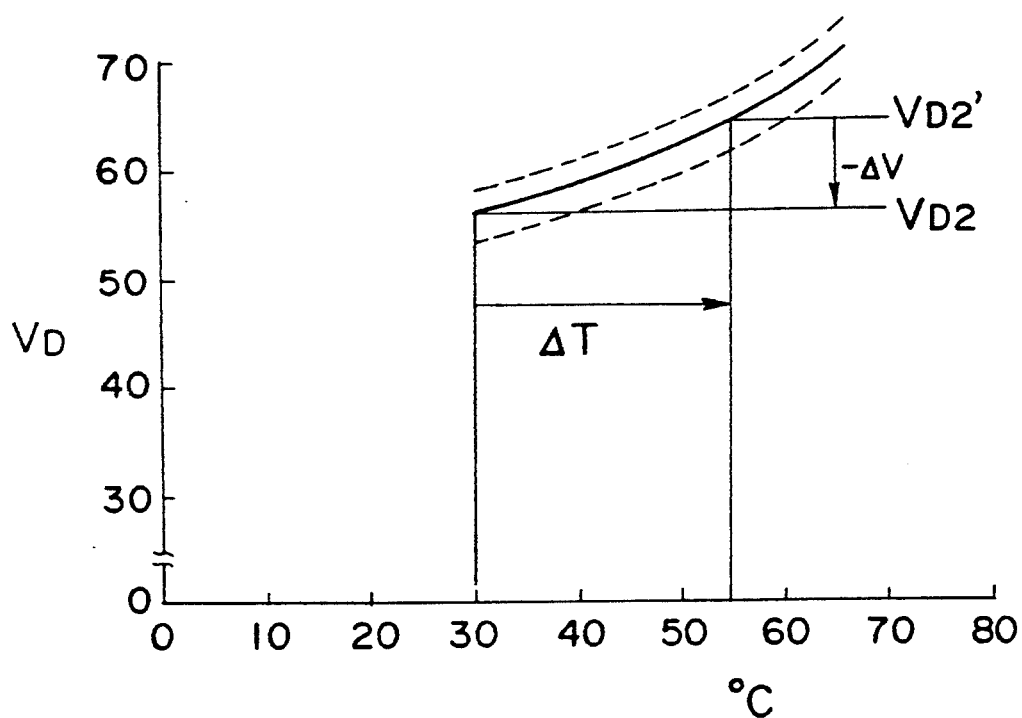
FIG. 13 is a graph showing a relationship between the temperature and the driving voltage.

Referring to FIG. 13 a relationship between the temperature and the mid half-wave voltage is shown, in which dotted curves represent the maximum and minimum half-wave voltages. By the use of this graph, the table stored in the temperature compensating circuit 28 is formed such that, for the temperature difference $\Delta T$, the compensating voltage $-\Delta V$ is stored.

Next, various modifications of the second embodiment are described.

In the above second embodiment, the mid half-wave voltage or the average half-wave voltage is used, but instead any other half-wave voltage between the maximum and minimum half-wave voltages can be used. Such an other half-wave voltage can be selected, for example, by a square mean value or any other know selecting means.

In addition, the driving voltage which is impressed to the PLZT chips may be pulses with "0" and "1" levels, or multi-level pulses. Furthermore, shutter device S may be used for forming a two tone image or a gradation (gray level) image recording. In the case of the gradation image recording, it may be so arranged that, after the driving voltage from the driving circuit is divided into different levels corresponding to the gradation of the recording information, the divided voltage is impressed to the required chip.

The arrangement for the temperature compensation as described above may be omitted.

Furthermore, instead of the manual setting of the initial voltage in the initial voltage setting circuit 29, the initial voltage may be set automatically. In this case, a detecting means for detecting the transmitting light amount individually for each PLZT chip is further provided. Thus, by the detecting means, the half-wave voltages for the different PLZT chips are detected by sequentially increasing the driving voltage from zero. Accordingly, using the obtained half-wave voltages, a mid half-wave voltage or the average half-wave voltage is calculated and is automatically set as the initial driving voltage. In this case, the automatic setting may be carried out periodically during a time period when the image forming is not carried out. In this manner, if the initial voltage setting is changed periodically, it is not necessary to provide the temperature compensating circuit 28 as well as the temperature sensor 27.

As is fully described hereinabove, the optical shutter device of the present invention is provided with the voltage adjusting circuit to change the driving voltage for the optical modulation based on the recording signals for each electrooptic chip. Since the driving voltage to the same recording information is changed for each chip in accordance with the preliminarily-detected characteristic of the electrooptic material, the amount of the transmitting light is rendered the same even when the characteristic of the electrooptic material is changed. Thus, the unevenness in the recording density can be removed. Moreover, since the driving voltage is changed for each chip, not for each segment, the complexity of the structure and operation of the device can be avoided. As a whole, the present invention offers an optical shutter device in a simple structure, realizing recording of good quality with uniform recording density.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical shutter device controlled by an image data comprising:

a driving power source for producing a driving voltage;

a shutter array comprising a plurality of chips, each chip having a plurality of shutter elements, each element being opened relative to said image data to form a light path therethrough to form a dot image, and wherein each chip has different electrooptic characteristics to which a different driving voltage is supplied to obtain optimum function of the shutter array; and a plurality of driving voltage adjusters, each of said adjusters being connected between said driving power source and said chip so as to supply a common adjusted driving voltage to the elements of a chip, said voltage adjuster providing a common adjusted driving voltage to said chip to equalize the different electrooptic characteristics of the chips.

2. An optical shutter device as claimed in claim 1, wherein the chips are made of an electrooptic material.

3. An optical shutter device as claimed in claim 2, wherein said electrooptic material is PLZT, and said chip is formed by sintering the PLZT.

4. An optical shutter device as claimed in claim 3, wherein said shutter array further comprises a pair of polarizing members which are arranged in a crossed Nichol at a front surface and at a rear surface of said chips.

5. An optical shutter device as claimed in claim 1, wherein said driving voltage adjusters comprise at least one diode connected between said driving power source and at least one chip.

6. An optical shutter device as claimed in claim 1, wherein said driving voltage adjusters comprise at least one resistor having a resistance value corresponding to the electrooptic characteristics of said chip.

7. An optical shutter device as claimed in claim 1, wherein each of said plurality of chips is respectively connected to each of a plurality of grounding lines for connection to ground, and wherein said driving adjuster is connected in series to each of said grounding lines.

8. An optical shutter device as in claimed in claim 7, wherein said driving voltage adjuster comprises at least one diode connected in series in at least one of said plurality of grounding lines.

9. An optical shutter device as claimed in claim 8, wherein said driving voltage adjuster further comprising a discharging diode connected in reverse direction and in parallel to said series connected diode, so as to discharge the electric charge stored at opposite ends of said series connected diode.

10. An optical shutter device as claimed in claim 7, wherein said driving voltage adjuster comprises at least one resistor having a resistance value corresponding to the electrooptic characteristic of said chip.

11. An optical shutter device as claimed in claim 1, wherein said image data supplying means comprises a pulse generating means for supplying pulses representing said image data to each of said element.

12. An optical shutter device as claimed in claim 11, wherein said image data supplying means further comprises a shift register means and latch means.

13. An optical shutter device controlled by an image data comprising:
  a driving power source (15) for producing a driving half-wave voltage;
  a shutter array (S) comprising a plurality of blocks (9) each block made of an electrooptic material and having a plurality of elements (9a), each element being opened relatively to said image data to form a light path therethrough to form a dot image, the degree of opening of said element being controlled by said driving voltage impressed to each block; and
  a driving voltage adjusting means (14) for adjusting the driving voltage from said driving power source to a selected fixed half-wave voltage between a maximum and a minimum half-wave driving voltage supplied to the plurality of blocks, and supplying said selected half-wave voltage to said blocks in said shutter array, so as to polarize the light passing through said light path at an angle of 90°.

14. An optical shutter device as claimed in claim 13, further comprising:
  a temperature detecting means for detecting the temperature of the blocks of said shutter array; and
  a temperature compensating means for correcting said half-wave voltage in accordance with the detecting result of said temperature detecting means.

15. An optical shutter device as claimed in claim 13, wherein said fixed half-wave voltage is a mid value between maximum and minimum half-wave voltages supplied to the plurality of chips.

16. An optical shutter device as claimed in claim 13, wherein said fixed half-wave voltage is an average of half-wave voltages supplied to the plurality of chips.

17. In an optical shutter device for controlling the passage of light in response to image data signals, the improvement comprising:
  a driving power source for producing a driving voltage;
  a shutter array, including a plurality of individual blocks of electro-optic material, each block having a plurality of segment elements capable of selectively blocking or passing the light in response to the image data signals, the individual blocks collectively forming the shutter array and at least some of the blocks having different voltage responsive characteristics from the other blocks, and
  means for adjusting an applied voltage to all of the segment elements on each individual block from the driving voltage including means for varying the amount of applied voltage to each block in accordance with the individual voltage responsive characteristics of the block.

18. An optical shutter device as claimed in claim 17 wherein the means for adjusting an applied voltage to each block includes a series of diodes.

19. An optical shutter device as claimed in claim 17 wherein the means for adjusting an applied voltage to each block includes at lest one resistor.

20. An optical device as claimed in claim 17 further including means for applying the image data signals to individual segment elements.

21. An optical shutter device comprising:
  a driving power source for producing driving voltage;
  a shutter array formed of a plurality of discrete chips, each chip having a plurality of individual electrooptic shutter elements which are arranged to be selectively addressed with driving voltage from said driving power source to perform optical modulation, said chips having different electrooptic characteristics between them wherein said chips require different levels of driving voltage to achieve optimum optical modulation; and
  driving voltage adjusting means for adjusting the level of the driving voltage for each chip, thereby equalizing the different electrooptic characteristics of said chips so that the chips of the shutter array perform essentially identically despite having different electrooptic characteristics.

* * * * *